(12) United States Patent
Bourdev

(10) Patent No.: US 7,181,687 B2
(45) Date of Patent: Feb. 20, 2007

(54) PREVIEWING THE EFFECTS OF FLATTENING TRANSPARENCY

(75) Inventor: Lubomir D. Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 571 days.

(21) Appl. No.: 10/186,129

(22) Filed: Jun. 27, 2002

(65) Prior Publication Data

US 2004/0001227 A1 Jan. 1, 2004

(51) Int. Cl.
*G06F 17/00* (2006.01)
(52) U.S. Cl. .................. 715/527; 715/526; 715/521
(58) Field of Classification Search ............. 715/500, 715/502, 515, 521, 526, 527
See application file for complete search history.

(56) References Cited

U.S. PATENT DOCUMENTS

| | | | |
|---|---|---|---|
| 4,769,636 A | 9/1988 | Iwami et al. |
| 5,153,937 A | 10/1992 | Wobermin et al. |
| 5,337,404 A | 8/1994 | Baudelaire et al. |
| 5,390,291 A | 2/1995 | Ohashi |
| 5,509,110 A | 4/1996 | Latham |
| 5,534,915 A | 7/1996 | Sandrew |
| 5,555,352 A | 9/1996 | Lucas |
| 5,589,851 A | 12/1996 | Valdes et al. |
| 5,600,763 A | 2/1997 | Greene et al. |
| 5,649,083 A | 7/1997 | Barkans et al. |
| 5,680,526 A | 10/1997 | Andresen et al. |
| 5,687,304 A | 11/1997 | Kiss |
| 5,745,121 A | 4/1998 | Politis |
| 5,818,962 A | 10/1998 | Mizukami |
| 5,818,975 A | 10/1998 | Goodwin et al. |
| 5,841,443 A | 11/1998 | Einkauf |
| 5,889,527 A | 3/1999 | Tsai |
| 5,912,672 A | 6/1999 | Liguori |
| 5,912,674 A | 6/1999 | Magarshak |
| 5,923,333 A | 7/1999 | Stroyan |
| 5,926,185 A | 7/1999 | Vyncke et al. |
| 5,936,634 A | 8/1999 | Kawamoto et al. |
| 5,977,979 A | 11/1999 | Clough et al. |
| 5,991,461 A | 11/1999 | Schmucker et al. |
| 6,011,595 A | 1/2000 | Henderson et al. |
| 6,020,897 A | 2/2000 | Carlsen et al. |

(Continued)

FOREIGN PATENT DOCUMENTS

EP 0528631 2/1993

(Continued)

OTHER PUBLICATIONS

Adobe Creative Team, Adobe Illustrator 9.0 Classroom In A Book, Adobe Press, Oct. 5, 2000, pp. 1-14 (as printed from the web).*

(Continued)

*Primary Examiner*—Stephen Hong
*Assistant Examiner*—Gregory J. Vaughn
(74) *Attorney, Agent, or Firm*—Fish & Richardson P.C.

(57) ABSTRACT

A method of previewing the effects of flattening transparency is provided. The method includes displaying a first presentation of a document containing transparency, receiving settings affecting how the document is flattened for a desired output and displaying a second presentation of the document in accordance with the settings.

73 Claims, 3 Drawing Sheets

U.S. PATENT DOCUMENTS

| | | |
|---|---|---|
| 6,031,544 A | 2/2000 | Yhann |
| 6,043,824 A | 3/2000 | Bier |
| 6,049,339 A * | 4/2000 | Schiller et al. ............. 345/630 |
| 6,072,501 A | 6/2000 | Bier |
| 6,198,489 B1 | 3/2001 | Salesin et al. |
| 6,289,364 B1 * | 9/2001 | Borg et al. ................. 715/526 |
| 6,298,172 B1 * | 10/2001 | Arney et al. ................ 382/293 |
| 6,356,274 B1 | 3/2002 | Spector |
| 6,359,635 B1 | 3/2002 | Perttunen |
| 6,389,161 B1 | 5/2002 | Krabbenhoft |
| 6,437,796 B2 | 8/2002 | Sowizral et al. |
| 6,515,675 B1 | 2/2003 | Bourdev |
| 6,553,139 B1 | 4/2003 | Kaup |
| 6,651,121 B1 * | 11/2003 | Zurawski et al. ........... 710/100 |
| 6,720,977 B1 | 4/2004 | Bourdev et al. |
| 6,757,888 B1 * | 6/2004 | Knutson et al. ............. 717/109 |
| 6,850,956 B1 * | 2/2005 | Knutson ..................... 707/201 |
| 6,859,553 B1 | 2/2005 | Bourdev et al. |
| 6,868,193 B1 * | 3/2005 | Gharbia et al. ............. 382/305 |
| 6,894,704 B1 | 5/2005 | Bourdev et al. |
| 2005/0116963 A1 | 6/2005 | Bourdev et al. |

FOREIGN PATENT DOCUMENTS

| | | |
|---|---|---|
| EP | 0712089 | 5/1996 |
| EP | 0924653 | 6/1999 |
| EP | 1104918 | 5/2005 |
| JP | 2001-188915 | 7/2001 |

OTHER PUBLICATIONS

Baudelaire, et al., "Planar Maps: An Interaction Paradigm for Graphic Design", *SIGCHI Bulletin*, New York, NY, USA, pp. 313-318, May 1989.

Heckbert (ed.), *Graphics Gems IV*, 1994, AP Professional, Academic Press, Inc., Cambridge, MA, pp. 29-30.

* cited by examiner

PREVIEWING THE EFFECTS OF FLATTENING TRANSPARENCY

TECHNICAL FIELD

This invention relates to previewing flattening transparency effects.

BACKGROUND

An electronic document file may include various types of objects, such as text, line art, and images, which may be generated and edited by a user on a computer system with graphics application software. Most graphics application software can also be used to produce printed output defined by the electronic document file.

In some cases, the objects on a page of an electronic document file may be transparent, with varying degree, so that objects that are placed behind the transparent objects can be seen through the transparent objects. When a user wishes to generate a printed copy of the electronic document file, the file is converted into a format that can be understood by a printing device in a process generally referred to as rendering. If an electronic document file contains a combination of transparent and opaque objects, the objects on each page of the electronic document file are broken up into opaque pieces, also referred to as atomic regions, during the rendering process, so that they may be printed on the printing device; this process is known as flattening.

SUMMARY

In an aspect, the invention features an interface including a display of a preview of a result when flattening transparency in a document.

One or more of the following may be included. The display may include a settings region. The settings region may reside inside a dialog box, outside of a dialog box and/or previously defined according to an output context. The output context may be a printer device type or a file type. The display may include graphical feedback and/or textual feedback.

The settings region may include a flattening settings region. The flattening settings region may control a degree of rasterization of areas in the document, a resolution that is used to rasterize areas in the document and/or minimize visible stitching problems by clipping rasterized areas along paths of existing objects in the document. The flattening settings region may control a conversion of all text to outlines in the document, a conversion of all strokes to outlines in the document, and/or simulating overprint for objects in the document involved in transparency and preserves native overprint instructions for objects in the document not involved in transparency. The flattening settings region may control ignoring all overprint instructions for all objects in the document.

The settings region may include a preview settings region. The preview settings region may control a toggle between a quick preview and a detailed preview. The preview settings region may control selecting a flattening output context. The output context may be an EPS output, a composite output or a legacy output.

The preview settings region may control which areas in the document will get rasterized, a display of which objects in the document are sources of transparency, a display of which objects in the document are involved in transparency and/or a display of all patterns that get expanded due to flattening. The preview settings region may control a display of all strokes that get outlined due to flattening, a display of all areas in the document where text is converted to outlines, all cases where rasterization happens during flattening and/or a display of which objects have their overprint preserved, flattened or ignored. The preview settings region may control a display of which spot objects will be converted to process and/or a display of which objects will generate content on more process plates than their actual color.

The display may include a preview window, and the preview window may include a refresh button. The refresh button may control redisplay of the document in the preview window.

In another aspect, the invention features a method of previewing effects of flattening transparency including receiving settings affecting how the document is flattened for a desired output, and displaying a first presentation of the document in accordance with the settings.

One or more of the following may be included. The settings may be pre-defined according to a type of the desired output or user-selectable. The user-selectable settings may include flattening settings. The flattening settings may include a setting that controls a degree of rasterization of areas in the document, a setting that controls a resolution used to rasterize areas in the document, and/or a setting that minimizes visible stitching problems by clipping rasterized areas along paths of existing objects in the document. The flattening settings may include a setting that controls a conversion of all text to outlines in the document, a setting that controls a conversion of all strokes to outlines in the document, a setting that controls simulating overprint for objects in the document not flattened and/or a setting that controls ignoring overprint instructions for all objects in the document.

The user-selectable settings may include preview settings. The preview settings may include a setting that toggles between a quick preview and a detailed preview, a setting that selects a flattening output context, a setting that controls a display of which areas in the document get rasterized, and/or a setting that controls a display of which objects in the document are sources of transparency. The preview settings may include a setting that controls a display of which objects in the document are involved in transparency, a setting that controls a display of all patterns that get expanded due to flattening, a setting that controls a display of all strokes that get outlined due to flattening, a setting that controls a display of all areas in the document where text is converted to outlines and/or a setting that controls a display of all cases where rasterizations occurs during flattening. The preview settings may include a setting that controls a display of which objects have their overprint preserved, flattened or ignored, a setting that controls a display of which spot objects will be converted to process, and/or a setting that controls a display of which objects will generate content on more process plates than their actual color.

The first presentation may be graphical and/or textual. The method may also include receiving a change in the settings, and displaying a second presentation of the document in accordance with the change in settings. Displaying the third presentation may be user-controllable or automatic in response to receiving the change in settings.

The desired output may be a printer or a file.

Embodiments of the invention may have one or more or the following advantages.

The process provides a flattening preview that shows whether a document contains any transparency and thus requires flattening.

The process provides a flattening preview that shows which are the transparent objects.

The process provides a flattening preview that shows which objects are affected by transparency and which patterns will be expanded as a result of flattening.

The process provides a flattening preview that shows which encapsulated postscript (EPS) files will be expanded.

The process provides a flattening preview that shows which strokes were converted to outlines as a result of flattening and which texts were converted to outlines as a result of flattening.

The process provides a flattening preview that shows which areas got rasterized because of their complexity and which atomic regions were rasterized.

Other features and advantages of the invention will become apparent from the description, the drawings, and the claims.

DETAILED DESCRIPTION

Figure 1:
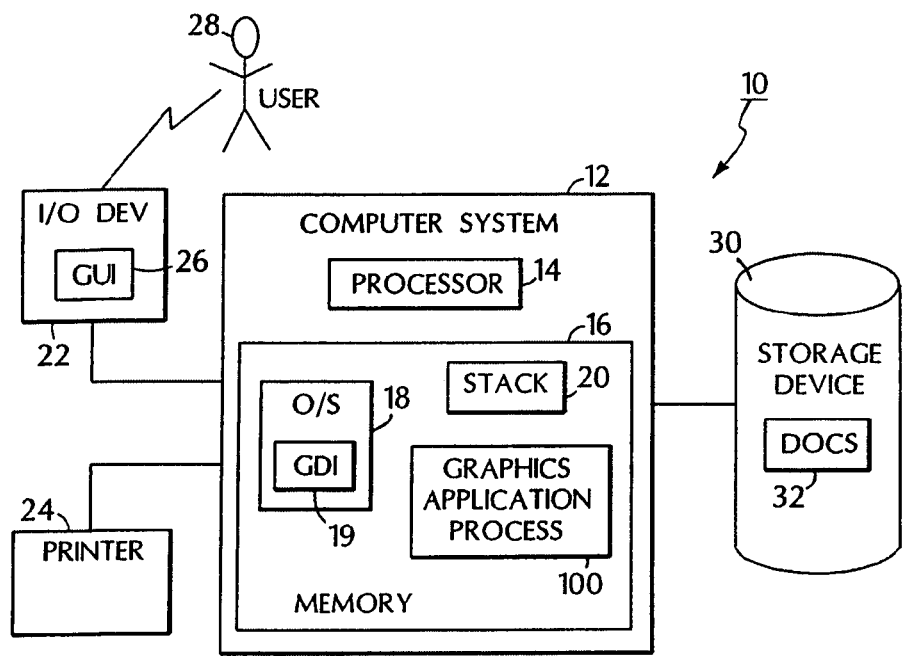
FIG. 1 is a block diagram of a system.

Referring to FIG. 1, a vector graphic system 10 includes a computer system 12 having, for example, a processor 14 and a memory 16. Memory 16 stores an operating system ("O/S") 18, such as Windows XP or Linux, including a graphics device interface ("GDI") 19. Memory 16 also stores a TCP/IP protocol stack 20 for communicating with a network (not shown) and machine-executable instructions executed by processor 14 to perform a graphics application process 100, such as Illustrator® from Adobe Systems Incorporated of San Jose, Calif., incorporated herein by reference.

The system 10 includes a link to a first input/output ("I/O") device 22, such as a display device, and a link to second I/O device 24, such as a printing device. The first I/O device 22 includes a graphical user interface (GUI) 26 for display to a user 28. The system 10 also includes a link to a storage device 30 for storing a database of documents 32. The documents 32 may contain various types of objects, such as text, line arts, and images, which may be generated and edited by the user 28 on the system 10 with the graphics application process 100. These same documents 32 may also be printed on the second I/O device 24 by production of printer output using the graphics application process 100, or saved to a file in the storage device 30.

When graphics application process 100 prints information on printer 24 or displays information on the GUI 26, graphics application process 100 makes calls to the GDI 19. The GDI GDI 19 is a system by which graphics are displayed in the O/S 18. The graphics application process 100 sends GDI 19 parameters for an image to be represented. The GDI 19 produces the image by sending commands to the GUI 26, the printer 24, or other output device (not shown).

Figure 2:
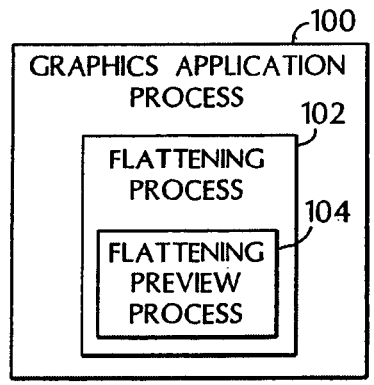
FIG. 2 is a flow diagram of the graphics application process of FIG. 1.

Referring to FIG. 2, the graphics application process 100 includes a set of integrated tools for creating and optimizing documents containing graphic objects such as line art and images.

Figure 3A:
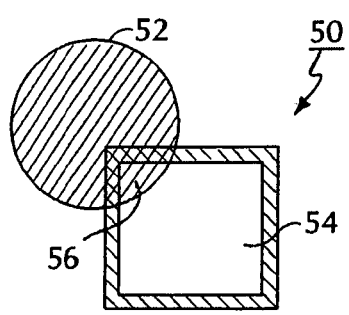
FIG. 3A is an exemplary graphic image
Figure 3B:
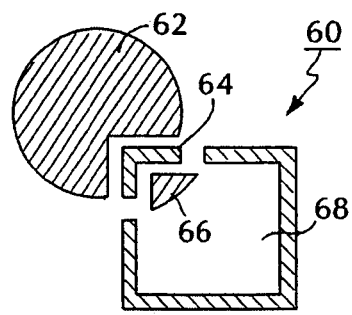
FIG. 3B is an exemplary flattened graphic image.

When a document contains images that overlap they may exhibit overlapping transparent artwork, e.g., an area of the document contains part of one image that can be seen under part of another image, thus, there appears to be a transparent region. When a document that contains transparency is printed or saved to a file in a format that does not understand transparency, the document gets "flattened" in a flattening process 102. The flattening process 102 converts a document that contains transparency into a visually equivalent document that contains no transparency. More specifically, the flattening process 102 converts all overlapping elements in a stack of transparent objects into a format that captures a look of an original transparency for printing or saving to a file. In general, the flattening process 102 converts a document that has vector objects to vector objects and raster objects without transparency where at least some of the results have vectors preserved. To achieve this, the flattening process 102 examines interactions at every point of the transparency and does several operations to the artwork. Examples of flattening process 102 may be found in commonly assigned U.S. Pat. Nos. 6,049,339 and 6,289,364, incorporated by reference in their entirety Referring to FIG. 3A, an exemplary graphic image 50 includes a circular object 52 overlapping a rectangular object 54 at an overlapping region 56. The flattening process 102 cuts transparent art, such as graphic image 50, apart and represents overlapping transparent regions by discrete, abutting elements, each with its own color. More specifically, the flattening process 102 cuts transparent art apart to represent overlapping areas as discrete pieces that are either vector objects or rasterized areas. The graphic image 50 only involves vector objects. As artwork becomes more complex (e.g., mixing images, vectors, type, spot colors, overprinting and so forth) so does the flattening and its results. Referring now to FIG. 3B, the original graphic image 50 of FIG. 3A is shown as flattened artwork 60. Flattened artwork 60 includes discrete, abutting elements 62, 64, 66, 68.

The flattening process 102 examines the interactions at every point of the transparency and does the following. The flattening process 102 retains an integrity of the original transparent objects as much as possible (e.g., type stays type and vectors stay vectors), but it may rasterize some type or artwork when necessary, based on a file's complexity and the flattener settings in effect at the time.

The flattening process 102 sets a resolution of rasterized areas to a specific, device-dependent value that is defined by the flattener settings or parameters in effect at the time.

If overprinting is also used in a file, the flattening process 102, by default, may process the overprinting objects as it would process overlapping transparent objects.

Although the user 28 can specify flattening parameters, such as quality/speed of the flattening, rasterization resolution, raster effects resolution and mesh resolution, the user 28 does not typically obtain any feedback or preview on how the current document will change as a result of flattening with the current parameters. That is, the user 28 typically cannot make intelligent decisions for what flattening parameters are best to use for the current document because the user 28 does not know how the current flattening settings will affect the document. The user 28 typically tries different settings, by a trail and error process, until the user 28 is satisfied with a print result. This can be costly and time consuming. For example, rasterizing certain very complex areas can significantly improve print time, but may not be desirable if those areas contain small fonts that will get partially rasterized.

Referring again to FIG. 2, the flattening process 102 includes a flattening preview process 104. The flattening preview process 104 provides the user 28 with a quick feedback on the effects of flattening a document with current flattening settings and thus increases the predictability of the flattening process 102. The flattening preview process 102 previews the effects of flattening transparency. The preview may be visual and/or textual. The preview may preview different things, such as, for example, the areas in a document that are rasterized, which objects are transparent, which objects are affected by transparency, and which areas are expanded. A graphical preview may draw an illustration in grayscale and highlighted areas/objects in color. A preview may include feedback about estimated time, memory and spool file size that would be required due to flattening.

In an example, the flattening preview process 104 displays a palette. Other examples may include a model dialog or other dialog to the user 28 on the GUI 26 that allows the user 28 to preview the expected result when flattening transparency (e.g., as part of printing to a postscript printing device such a printer 24). The preview is not necessarily visual. For example, one may have a system that beeps if any text will be rasterized due to flattening. The palette increases the predictability of the flattening process 102 by providing an interactive, near-realtime feedback to the user 28, thus simplifying workflow and allowing more targeted control by the user 28 of flattening parameters.

Figure 4:
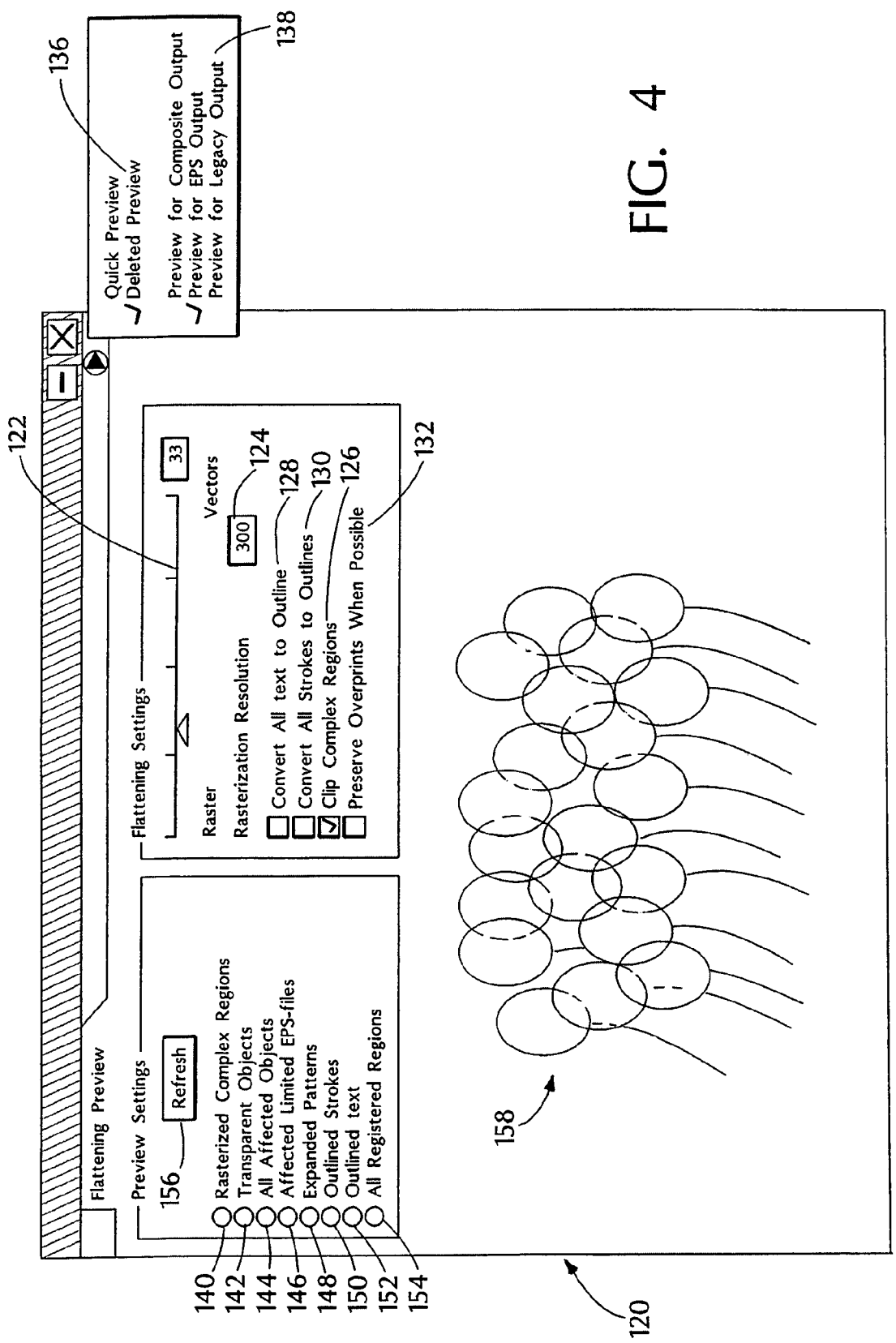
FIG. 4 is an exemplary flattening preview palette.

Referring to FIG. 4, an exemplary flattening preview palette 120 is shown. The palette 120 includes a number of user-selectable/controllable settings 122, 124, 126, 128, 130, 132, 136, 138, 140, 142, 144, 146, 148, 150, 152, 154, 156 and 158. In this example, the settings are contained within a dialog box and the user 28 interacts with them. In other examples, the settings are outside of the dialog box and/or previously set (e.g., pre-defined) according to specific target printer types and/or file format types.

Settings 122, 124, 126, 128, 130 and 132 are generally referred to as flattening settings. Settings 136, 138, 140, 142, 144, 146, 148, 150, 152, 154, 156 and 158 are generally referred to as preview settings. Other preview settings (not shown) may include a preview of which objects have their overprint preserved, flattened or ignored, a preview of which spot objects will be converted to process, a preview of which objects will generate on more process plates than their actual color, and a preview of the time, memory and spool size that is required to flatten the current document using the current flattening settings.

Setting 122 is a flattening slider. Flattening a document, as described above, involves breaking the overlapping transparent objects into small pieces. For most documents, the number of such pieces and the time to compute them is reasonable, but some complex documents result in thousands of such pieces, many of which may be smaller than a pixel. Flattening such documents may take considerable time and resources and, for some print jobs, it may be better to rasterize very complex areas in the document, rather than trying to preserve them in vector form. Such rasterization, however, can occasionally degrade the quality of a print job. Choosing whether and how aggressively to rasterize depends on the user's intent (fast proof vs. high-quality print), the time and computing resources available.

The setting 122 controls the degree of rasterization of complex areas in the document.

In an example, the rightmost position (value=100) is the default. In this position no areas in the document will get rasterized for performance reasons. The intermediate positions (values=1 . . . 99) result in rasterizing areas that are complex and preserving simple ones in vector form. For example, a single transparent pattern may be preserved intact, while portions of overlapping patterns may get rasterized. In the intermediate settings only areas that contain transparent objects may get rasterized. When the setting 122 is in the leftmost position (value =0), all objects, transparent or not, will get rasterized.

Setting 124 is a rasterization resolution setting. Rasterization resolution is the resolution that is used to rasterize complex areas, as described above.

Setting 126 is a clip complex regions setting. When the user 28 needs to rasterize for performance reasons, as described above, all objects are rasterized in a given region in the document. The document is divided into an invisible grid and only some cells in this grid, where complexity is high, get rasterized. This type of rasterization can result in objects some parts of which get rasterized and others remain in vector form. The vector/raster boundary follows the invisible grid and not existing object's paths. Many printer drivers' process rasters differently from vectors—they have special "Vivid Color" or "Intelligent Color" options for better previews of photos (usually those settings are on by default, sometimes such settings are set in the printer itself, and in some cases disabling them is not possible). Therefore rasterizing for performance reasons, as described above, can be a source of stitching problems along the vector/raster boundary.

The setting 126 allows the user 28 to significantly minimize and usually eliminate any visible stitching problems by clipping the rasterized areas along the paths of existing objects. Since there is already color discontinuity along object's paths, any such stitching problems will not be noticeable.

The setting 128 refers to a convert all text to outlines setting. Usually text is preserved in native form after flattening. There are some cases where text will be converted to outlines; for example, in Illustrator®, when it is used as a clip, when it has a pattern fill or a stroke, when it is used in a very complex region and interacts with many other transparent fonts. Sometimes only portions of a transparent text that overlap gradients or images may get converted to outlines.

Small fonts converted to outlines may appear noticeably thicker, especially in lower-end printing systems. The setting 128 is used to convert all text to outlines in the document, which results in consistent appearance for all text.

Setting 130 refers to a convert all strokes to outlines setting. Usually only strokes involved in transparency are converted to outlines and the others not involved in transparency are preserved in native form. A thin stroke converted to outline may look slightly thicker, especially in lower-end printing systems. In some documents where there are thin strokes next to each other some of which are involved in transparency, the discrepancy may be noticeable. Setting 130 is used to convert all strokes in the document to outlines, which will result in their consistent thickness.

Setting 132 refers to a preserve overprints when possible setting. There are several other options for treating overprint. Which option is in provided depends on the context of flattening. One option is to ignore overprint instructions for all objects. This is useful, for example, to preserve the legacy Adobe Illustrator® 8 behavior when printing to a composite printer (composite printers usually ignore overprint instructions).

A second option is to simulate the appearance of overprint (flatten the overprint) for all objects. This option is useful when simulating overprint to a composite printer. This option causes overprint to be treated as a special blending mode, and all overprinted objects will be treated as transparent. This option causes documents containing overprint, but otherwise opaque, to be flattened (unless printing to separations). Flattened overprint may not work against a new background if the flattened file is placed in an aggregate application.

A third option is to simulate overprint for objects involved in transparency, but preserve native overprint instructions for objects not involved in transparency. This option makes sense when printing to a separations printer, in which case simulated or native overprint will end up producing the same appearance. By preserving some objects overprint in native form, the set of objects involved in transparency is decreased, and thus improving the performance of flattening and quality of the output.

A fourth option is to preserve native overprint for all objects. This option is only possible for documents that contain no transparency.

Figure 5:
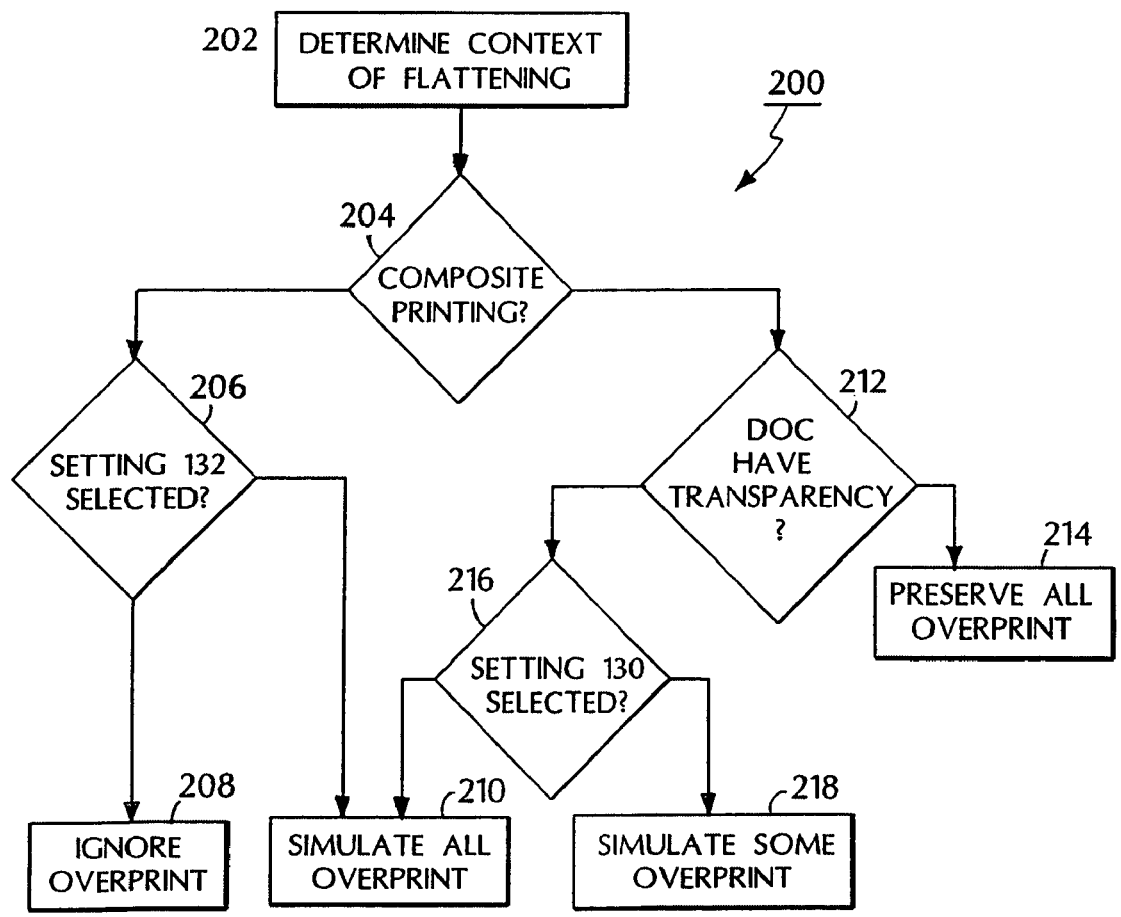
FIG. 5 is a flow diagram of an overprint treatment process.

Referring to FIG. 5, an overprint treatment process 200 includes determining (202) a context of flattening. The process 200 determines (204) whether it is composite printing. If composite printing, the process 200 determines (206) whether setting 132 is selected. If setting 132 is selected, the process 200 ignores (208) overprint instructions for all objects. If setting 132 is not selected, the process 200 simulates (210) appearance of overprint for all objects.

If not composite printing, the process 200 determines (212) whether the document has transparency. If the document contains no transparency, the process 200 preserves (214) native overprint for all objects.

If the document contains transparency, the process determines (216) whether setting 130 is selected. If setting 130 is selected, the process 200 simulates (218) overprint for objects involved in transparency and preserves native overprint instructions for objects not involved in transparency. If setting 130 is not selected, the process 200 simulates (210) the overprint for all objects.

The flattening settings 122, 124, 126, 128, 130, and 132, described above, apply to a current document. When no document is open all flattening settings 122, 124, 126, 128, 130, and 132 are disabled. The flattening preview process 104 is interactive. For example, in certain instances, when a user selects one aspect, other non-appropriate aspects are disabled. Thus, the flattening preview subprocess 104 provides feedback to the user 28 when a particular aspect is selected and some corresponding features do not apply. For example, when the flattening slider setting 122 is at the rightmost position (value=100), one will never rasterize for performance reasons and therefore in this case the Rasterization Resolution setting 124 and the Clip Complex Regions setting 126 are disabled. (In general, if in the current settings don't rasterize for performance reasons, these settings are irrelevant). When the flattening slider setting 122 is at the leftmost position (value=0) the entire document will be rasterized. Therefore all three flattening setting 128, 130, and 132 are disabled.

In Adobe Illustrator® 10, when flattening for legacy output all text gets converted to outlines. In this case the Convert All Text to Outlines setting 128 is checked and disabled.

As discussed above, settings 136–158 are generally referred to as preview settings. The preview settings allow the user 28 to preview whether and where in the document certain events take place. The user 28 can use this information to make changes to the flattening controls or the document.

A setting 136 refers to a quick vs. detailed preview mode selection. In general, some of the settings may take longer to compute than others. The settings that take longer to compute are typically only available in a detail preview mode. For example, most of the preview events can be computed very quickly. In Illustrator® 10, the outlined text setting 152 and all rasterized regions setting 154, however, may take significant amount of time to compute and are only available in a detailed preview mode. A detailed preview mode is used only if the user needs to preview those events that take a long time to compute. A quick preview is as accurate as the detailed preview.

A setting 138 refers to a selecting a flattening output context option. The result of flattening and the set of flattening controls depend on the context in which the flattener is used. The palette 120 provides for previewing three different contexts, i.e., a preview for EPS output context, a preview for composite output text and a preview for legacy output context.

The preview for EPS output context is the context of saving an EPS file, but it is very similar to separations printing and it usually can provide reliable preview of flattening when printing to separations.

The preview for composite output context is the context of printing to a composite printer. In this mode overprint behavior is controlled by selection of the setting to ignore overprinting in composite output.

The preview for legacy output context is the context of saving as Adobe Illustrator® 8, PDF 1.3, EPS 8, and the "Flatten Transparency " command. For this context all text is converted to outlines and the corresponding setting 128 is checked and disabled.

Setting 140 refers to a rasterized complex regions option. Setting 140 is used to preview which areas in the document will get rasterized for performance reasons. The boundary of the previewed area has a higher probability for stitching problems (depending on the print driver settings and the rasterization resolution).

Setting 142 refers to a transparent objects option. The setting 142 is used to preview which objects are sources of transparency. If there are no such objects, the document will not be flattened and the flattening settings are not relevant.

The most common source of transparency is transparent objects, objects with blending modes or opacity masks. Certain styles and effects may contain transparency inherently. Overprinted objects may be treated as sources of transparency if they are involved in transparency or overprint needs to be flattened.

Setting 144 refers to an all affected objects option. Setting 144 shows all objects that are involved in transparency. That includes transparent objects and objects that are overlapped by (or very close to and later in paint order than) transparent objects. The previewed objects will be affected by the flattening process 102, i.e., their strokes or patterns will be expanded, portions of them may get rasterized, and so forth.

An affected linked EPS files setting 146 shows all linked EPS files that are affected by transparency.

An expanded patterns setting 148 shows all patterns that get expanded because they are involved in transparency.

An outlined strokes setting 150 shows all strokes that get outlined because they are involved in transparency or the setting 130 "Convert All Strokes to Outlines " is checked. Outlined strokes may appear slightly different than native ones, especially very thin strokes and when printed to lower-end printers.

An outlined text setting 152 shows all areas where text is converted to outlines. Text converted to outlines may appear slightly different than a native text, especially small fonts and when printed to lower-end printers.

A setting 154 refers to an all rasterized regions option. In some cases, some objects or intersections of objects need to be rasterized because there is no other way of representing them in an output format, such as, for example, PostScript. The simplest example of this is the intersection of two transparent gradients. Rasters of this kind are clipped along objects' paths. The objects that get rasterized contain no edges and are usually gradients or gradient meshes with low color frequency and the Gradient Mesh Resolution from the Document Setup is usually used. (unless images are involved). Therefore, such rasters are usually not a source of stitching or quality problems.

Setting 154 shows all cases where rasterization happens during flattening.

As mentioned above, the preview settings allow the user to preview whether and where in the document certain events take place. The user can use this information to make changes to the flattening controls or the document. The user can press a refresh button 156 and in a few seconds the current document is displayed in a preview window 158. When the document or flattening settings change, the preview in the preview window 158 is no longer accurate and the preview window 158 is cleared. The user need only press the refresh button 156 to refresh the preview in the preview window 158.

Process 100 can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Other embodiments are within the scope of the following claims.

What is claimed is:

1. A computer program product tangibly embodied in a machine-readable storage device for execution by a programmable processor to:
receive a user input specifying requested preview information in reference to a flattening process that would convert, in accordance with flattening settings, a first document that contains transparency to a visually equivalent second document that contains no transparency, the first document having first vector objects including one or more objects with transparency, the second document having second vector objects with no transparency; and
present a display to a user before performing the flattening process to convert the first document to the second document, the display including a preview of characteristics of the flattening process as it would be performed in accordance with the settings, the preview including the requested preview information including an express indication of one or more of the following:
which objects in the document would have their overprint preserved, flattened or ignored by the flattening process,
which spot objects in the document would be converted to process object by the flattening process,
which objects in the document would generate on more process plates than their actual color,
a time that would be required by the flattening process to flatten the document,
a memory that would be required by the flattening process to flatten the document,
a spool size that would be required by the flattening process to flatten the document,
which areas in the document would be rasterized by the flattening process,
which objects in the document would be sources of transparency in the flattening process,
which objects in the document would be involved in transparency in the flattening process,
which linked EPS (Encapsulated PostScript) files in the document would be affected by transparency in the flattening process,
which patterns in the document would be expanded by the flattening process because they are involved in transparency,
which strokes in the document would be outlined by the flattening process because they are involved in transparency,
in which areas in the document would text be convened to outlines by the flattening process, or
where would rasterization happen during performance of the flattening process.

2. The product of claim 1 in which the display includes a settings region.

3. The product of claim 2 in which the settings region resides inside a dialog box.

4. The product of claim 2 in which the settings region resides in a model dialog, a palette or a toolbar.

5. The product of claim 2 in which the settings region includes previously defined settings according to an output context.

6. The product of claim 5 in which the output context is a context of printing to a printer device type.

7. The product of claim 5 in which the output context is a context of exporting to a file of a given type.

8. The product of claim 2 in which the settings region comprises a flattening settings region.

9. The product of claim 8 in which the flattening settings region includes an option to control a degree of rasterization of areas in the document.

10. The product of claim 8 in which the flattening settings region includes an option to control a resolution that would be used to rasterize areas in the document due to flattening.

11. The product of claim 8 in which the flattening settings region includes an option to minimize visible stitching problems by clipping rasterized areas along paths of existing objects in the document.

12. The product of claim 8 in which the flattening settings region includes an option to control a conversion of text to outlines in the document.

13. The product of claim 8 in which the flattening settings region includes an option to control a conversion of all strokes to outlines in the document.

14. The product of claim 8 in which the flattening settings region includes an option to control simulating overprint for objects in the document involved in transparency and preserving native overprint instructions for objects in the document not involved in transparency.

15. The product of claim 8 in which the flattening settings region includes an option to control ignoring all overprint instructions for all objects in the document.

16. The product of claim 2 in which the settings region comprises a preview settings region.

17. The product of claim 16 in which the preview settings region includes an option to control a toggle between a quick preview and a detailed preview.

18. The product of claim 16 in which the preview settings region includes an option to select a flattening output context.

19. The product of claim 18 in which the output context is exporting to a specific file format.

20. The product of claim 18 in which the output context is composite or separations printing.

21. The product of claim 18 in which the output context is cut-and-paste.

22. The product of claim 16 in which the preview settings region includes an option to control a display of which areas in the document would get rasterized due to flattening.

23. The product of claim 16 in which the preview settings region includes an option to control a display of which objects in the document are sources of transparency.

24. The product of claim 16 in which the preview settings region includes an option to control a display of which objects in the document are involved in transparency.

25. The product of claim 16 in which the preview settings region includes an option to control a display of all objects that would get expanded due to flattening.

26. The product of claim 16 in which the preview settings region includes an option to control a display of all strokes that would get outlined due to flattening.

27. The product of claim 16 in which the preview settings region includes an option to control a display of all areas in the document where text would get converted to outlines.

28. The product of claim 16 in which the preview settings region includes an option to control a display of all cases where rasterization would happen during flattening.

29. The product of claim 16 in which the preview settings includes a option to control a display of which objects would have their overprint preserved, flattened or ignored.

30. The product of claim 16 in which the preview settings controls a display of which spot objects would be converted to process objects.

31. The product of claim 16 in which the preview settings includes an option to control a display of which objects would generate content on more process plates than their actual color.

32. The product of claim 16 in which the preview settings includes an option to control a display for feedback of an estimated time, memory or spool/file size that would be required due to flattening.

33. The product of claim 1 in which the display further comprises graphical feedback.

34. The product of claim 33 in which the graphical feedback comprises a drawing of an illustration in grayscale and highlighted areas in color.

35. The product of claim 33 in which the graphical feedback comprises a preview of an illustration that a user can zoom and/or pan.

36. The product of claim 1 in which the display further comprises textual feedback.

37. The product of claim 36 in which the textual feedback comprises an estimated time, memory or spool/file size that would be required due to flattening.

38. The product of claim 1 in which die display includes a preview window.

39. The product of claim 36 in which the display further includes a refresh button.

40. The product of claim 39 in which the refresh button controls redisplay of the document in the preview window.

41. The product of claim 1, wherein:
the indication is effected by highlighting.

42. A method comprising:
receive a user input specifying requested preview information in reference to a flattening process that would convert, in accordance with flattening settings, a first document that contains transparency a visually equivalent second document that contains no transparency, the first document having first vector objects including one or more objects with transparency, the second document having second vector objects with no transparency; and present a display to a user before performing the flattening process to convert the first document to the second document, the display including a preview of characteristics of the flattening process as it would be performed in accordance with the flattening settings, the preview including the requested preview information including an express indication of one or more of the following:

which objects in the document would have their overprint preserved, flattened or ignored by the flattening process, which spot objects in the document would be converted to process objects by the flattening process.

which objects in the document would generate on more process plates than their actual color, a time that would be required by the flattening process to flatten the document, a memory that would be required by the flattening process to flatten the document a spool size that would be required by the flattening process to flatten the document, which areas in the document would be rasterized by the flattening process which objects in the document would be sources of transparency in the flattening process, which objects in the document would be involved in transparency in the flattening process, which linked EPS (Encapsulated PostScript) files in the document would be affected by transparency in the flattening process, which patterns in the document would be expanded by the flattening process because they are involved in transparency, which strokes in the document would be outlined by the flattening process because they are involved in transparency, in which areas in the document would text be converted to outlines by the flattening process, or where would rasterization happen during performance of the flattening process.

43. The method of claim 42 in which the settings are pre-defined according to a type of the desired output.

44. The method of claim 42 in which the settings are user-selectable settings.

45. The method of claim 44 in which the user-selectable settings include flattening settings.

46. The method of claim 45 in which the flattening settings include a setting that controls a degree of rasterization of areas in the document.

47. The method of claim 45 in which the flattening settings include a setting that controls a resolution used to rasterize areas in the document.

48. The method of claim 45 in which the flattening settings include a setting that controls an option to minimize visible stitching problems by clipping rasterized areas along paths of existing objects in the document.

49. The method of claim 45 in which the flattening settings include a setting that controls an option to convert all text to outlines in the document.

50. The method of claim 45 in which the flattening settings include a setting that controls an option to convert all strokes to outlines in the document.

51. The method of claim 45 in which the flattening settings include a setting That controls an option to simulate overprint for objects in the document not flattened.

52. The method of claim 45 in which the flattening settings include a setting that controls an option to ignore overprint instructions for all objects in the document.

53. The method of claim 45 in which the user-selectable settings include preview settings.

54. The method of claim 53 in which the preview settings include a setting that controls an option to toggle between a quick preview and a detailed preview.

55. The method of claim 53 in which the preview settings include a setting that controls an option to select a flattening output context.

56. The method of claim 53 in which the preview settings include a setting that controls an option to display which areas in the document would get rasterized due to flattening.

57. The method of claim 53 in which the preview settings include a setting that controls an option to display which objects in the document are sources of transparency.

58. The method of claim 53 in which the preview settings include a setting that controls an option to display of which objects in the document are involved in transparency.

59. The method of claim 53 in which the preview settings include a setting that controls an option to display of all objects that would get expanded due to flattening.

60. The method of claim 53 in which the preview settings include a setting that controls an option to display of all strokes that would get outlined due to flattening.

61. The method of claim 53 in which the preview settings include a setting that controls an option to display areas in the document where text would get converted to outlines due to flattening.

62. The method of claim 53 in which the preview settings include a setting that controls an option to display cases where rasterizations would occur during flattening.

63. The method of claim 53 in which the preview settings include a setting that controls an option to display which objects would have their overprint preserved, flattened or ignored.

64. The method of claim 53 in which the preview settings include a setting that controls an option to display which spot objects would be converted to process due to flattening.

65. The method of claim 53 in which the preview settings include a setting that controls an option to display which objects would generate content on more process plates than their actual color.

66. The method of claim 42 in which the first presentation includes a graphical feedback.

67. The method of claim 42 in which the first presentation includes a textual feedback.

68. The method of claim 42 further comprising:
receiving a change in the settings; and
displaying a second presentation of the document in accordance with the change in settings.

69. The method of claim 68 in which displaying the second presentation is user-controllable.

70. The method of claim 68 in which displaying the second presentation is automatic in response to receiving the change in settings or a change in the document.

71. The method of claim 42 in which the desired output is a printer.

72. The method of claim 42 in which the desired output is a file.

73. A computer comprising:
a storage medium having stored thereon instructions that when executed by the computer cause the computer to perform actions that comprise the following:
receive a user input specifying requested preview information in reference to a flattening process that would convert, in accordance with flattening settings, a first document that contains transparency to a visually equivalent second document that contains no transparency, the first document having first vector objects including one or more objects with transparency, the second document having second vector objects with no transparency; and
present a display to a user before performing the flattening process to convert the first document to the second document, the display including a preview of characteristics of the flattening process as it would be performed in accordance with the flattening settings, the preview including the requested preview information including an express indication of one or more of the following:
which objects in the document would have their overprint preserved, flattened or ignored by the flattening process.
which spot objects in the document would be converted to process objects by the flattening process,
which objects in the document would generate on more process plates than their actual color,
a time that would be required by the flattening process to flatten the document,
a memory that would be required by the flattening process to flatten the document, a spool size that would be required by the flattening process to flatten the document, which areas in the document would be rasterized by the flattening process.

which objects in the document would be sources of transparency in the flattening process, which objects in the document would be involved in transparency in the flattening process, which linked EPS (Encapsulated PostScript) files in the document would be affected by transparency in the flattening process, which patterns in the document would be expanded by the flattening process because they are involved in transparency, which strokes in the document would be outlined by the flattening process because they are involved in transparency, in which areas in the document would text be converted to outlines by the flattening process, or where would rasterization happen during performance of the flattening process.

\* \* \* \* \*

UNITED STATES PATENT AND TRADEMARK OFFICE
CERTIFICATE OF CORRECTION

PATENT NO. : 7,181,687 B1
APPLICATION NO. : 10/186129
DATED : February 20, 2007
INVENTOR(S) : Lubomir D. Bourdev It is certified that error appears in the above-identified patent and that said Letters Patent is hereby corrected as shown below:

Column 10, line 18, (claim 1) replace the phrase "in accordance with the settings" with --in accordance with the flattening settings--;

Column 10, line 49, (claim 1) replace the word "convened" with --converted--;

Column 11, line 63, (claim 29) replace the phrase "includes a option" with --includes an option--;

Column 12, line 22, (claim 38) replace the word "die" with --the--;

Column 12, line 24, (claim 39) replace the phrase "The product of claim 36" with --The product of claim 38--;

Column 12, line 34, (claim 42) replace the phrase "transparency a visually" with --transparency to a visually--;

Column 13, line 38, (claim 51) replace the word "That" with --that--;

Column 13, line 44, (claim 53) replace the phrase "The method of claim 45" with --The method of claim 44--;

Column 13, line 60, (claim 58) replace the phrase "display of which" with --display which--;

Column 13, line 63, (claim 59) replace the phrase "display of all" with --display all--;

UNITED STATES PATENT AND TRADEMARK OFFICE
CERTIFICATE OF CORRECTION

PATENT NO. : 7,181,687 B1
APPLICATION NO. : 10/186129
DATED : February 20, 2007
INVENTOR(S) : Lubomir D. Bourdev It is certified that error appears in the above-identified patent and that said Letters Patent is hereby corrected as shown below:

Column 13, line 66, (claim 60) replace the phrase "display of all" with --display all--;

Signed and Sealed this

Fifth Day of June, 2007

JON W. DUDAS
*Director of the United States Patent and Trademark Office*